United States Patent
Wildhagen

(10) Patent No.: US 7,092,460 B1
(45) Date of Patent: Aug. 15, 2006

(54) DIGITAL STEREO DEMULTIPLEXER

(75) Inventor: Jens Wildhagen, Weinstadt (DE)

(73) Assignee: Sony Deutschland GmbH, Cologne (DE)

( * ) Notice: Subject to any disclaimer, the term of this patent is extended or adjusted under 35 U.S.C. 154(b) by 689 days.

(21) Appl. No.: 09/691,711

(22) Filed: Oct. 18, 2000

(30) Foreign Application Priority Data

Oct. 20, 1999 (EP) .................................. 99120798

(51) Int. Cl.
*H03D 3/22* (2006.01)

(52) U.S. Cl. ........................................ 375/327; 381/2

(58) Field of Classification Search ................ 375/327, 375/373, 326; 381/2–4, 7, 10, 13–16, 12; 455/260, 205, 237.1, 208, 255–259; 329/315, 329/319, 360, 356, 325
See application file for complete search history.

(56) References Cited

U.S. PATENT DOCUMENTS

| | | | | |
|---|---|---|---|---|
| 3,999,132 A | * | 12/1976 | Smith ........................ | 455/156.1 |
| 4,159,398 A | * | 6/1979 | Hilbert et al. ................ | 381/16 |
| 4,827,515 A | * | 5/1989 | Reich ............................ | 381/7 |
| 5,023,909 A | * | 6/1991 | Kahn ........................... | 381/15 |
| 5,202,924 A | * | 4/1993 | Richards, Jr. ................ | 381/13 |
| 5,357,544 A | | 10/1994 | Horner et al. | |
| 5,440,586 A | * | 8/1995 | Den Braber ................ | 375/327 |
| 5,966,400 A | * | 10/1999 | Den Braber ................ | 375/327 |
| 6,694,026 B1 | * | 2/2004 | Green ........................... | 381/3 |

FOREIGN PATENT DOCUMENTS

EP  0 936 744  8/1999

* cited by examiner

*Primary Examiner*—Khanh Tran
(74) *Attorney, Agent, or Firm*—Oblon, Spivak, McClelland, Maier & Neustadt, P.C.

(57) ABSTRACT

In a stereo demultiplexer receiving a frequency demodulated stereo-multiplex signal (m(t)) which comprises at least a stereo-difference signal ($m_d$(t)), a stereo-sum signal ($m_s$(t)) and a pilot carrier, a PLL-circuit (4) to recover the pilot carrier and/or at least one harmonic thereof receives the sampling rate decimated stereo-sum signal ($m_s$(t)) as input signal, which is sampling rate decimated by a decimation factor of D. Therefore, the sampling rate decimation filter in the sum path is used for the sampling rate decimation to generate the $2^{nd}$ harmonic or any other harmonic of the pilot carrier. This sampling rate decimation filter is available anyway and therefore the sampling rate decimation of the pilot carrier can be performed without an additional filter.

15 Claims, 5 Drawing Sheets

DIGITAL STEREO DEMULTIPLEXER

The present invention relates to the demultiplexing of a frequency demodulated stereo-multiplex signal.

In fm-broadcasting a stereo-multiplex signal is frequency modulated. The stereo-multiplex signal consists of a stereo-sum signal and a stereo-difference signal. The stereo-difference signal is amplitude modulated with suppressed carrier. To allow a coherent amplitude demodulation of the stereo-difference signal at the receiver, a pilot carrier with half the AM-carrier frequency is added to the stereo-multiplex signal.

The stereo-sum signal and the stereo-difference signal are defined by $$m_s(t) = a_l(t) + a_r(t)$$

$$m_d(t) = a_l(t) - a_r(t)$$

wherein $a_l(t)$ is the signal of the left audio channel and $a_r(t)$ is the signal of the right audio channel.

The stereo-multiplex signal is defined by $$m_{stmux}(t) = m_s(t) + \sin(2\omega_{pil}t) \cdot m_d(t) + A_{pil} \sin(\omega_{pil}t)$$

wherein $\omega_{pil}$ is the carrier frequency and $A_{pil}$ is the amplitude of the carrier.

The stereo-multiplex signal is frequency modulated:

$$S_{FM}(t) = A_{FM} \cos\left(\omega_c(t) + \Delta\omega \int_{-\infty}^{t} m_{stmux}(\tau) d\tau\right)$$

with $\omega_c$: carrier frequency $\Delta\omega$: frequency deviation

At the receiver side the frequency modulated stereo-multiplex signal is frequency demodulated and stereo-demultiplexed to calculate the left and right audio signal.

For the stereo demultiplexing, the stereo demultiplexer needs to recover the $2^{nd}$ harmonic of the pilot carrier. Therefore, the pilot carrier is separated from the frequency demodulated stereo-multiplex signal m(t) by a bandpass filter and a PLL locks to the separated pilot carrier and generates the $2^{nd}$ harmonic of the pilot carrier. The $2^{nd}$ harmonic, that is locked in phase to the pilot carrier is needed for the coherent amplitude demodulation of the stereo-difference signal.

FIG. 3 shows the basic functionality of a state of the art stereo demultiplexer. The received frequency modulated stereo-multiplex signal $S_{FM}(t)$ is input to a frequency demodulator 17. The frequency demodulator 17 outputs the frequency demodulated stereo-multiplex signal m(t) that corresponds to the stereo-multiplex signal $m_{stmux}(t)$ as generated on the transmitter side. On basis of this stereo-multiplex signal m(t) a PLL-circuit 19 with preceding bandpass filter 18 generates the $2^{nd}$ harmonic of the pilot carrier, i.e. a signal $2 \cdot \sin(2\omega_{pil}t)$, which is needed for the coherent amplitude demodulation of the stereo-multiplex signal m(t) to gain the stereo-difference signal $m_d(t)$.

The coherent amplitude demodulation is performed by way of a demodulator 1 which receives the stereo-multiplex signal m(t) at its first input and the $2^{nd}$ harmonic of the pilot carrier at its second input. The output signal of the demodulator 1 is input to a filter 20 which outputs the stereo-difference signal $m_d(t)$.

The stereo-sum signal $m_s(t)$ is generated by a lowpass filtering of the stereo-multiplex signal m(t) with a lowpass filter 21 that receives the output signal of the frequency demodulator 17.

The left audio signal is calculated by an addition of the stereo-sum signal $m_s(t)$ and the stereo-difference signal $m_d(t)$ with an adder 3. The right audio signal r(t) is calculated by a subtraction of the stereo-difference signal $m_d(t)$ from the stereo-sum signal $m_s(t)$ with a subtracter 6.

Therefore, the stereo-sum signal $m_s(t)$ is generated by a lowpass filtering of the stereo-multiplex signal m(t) and the stereo-difference signal $m_d(t)$ is generated by a coherent amplitude demodulation of the amplitude modulated stereo-difference signal. The left and right audio signals l(t) and r(t) are calculated by addition and subtraction of the stereo-sum signal and the stereo-difference signal:

$$r(t) = m_s(t) - m_d(t) = (a_l(t) + a_r(t)) - (a_l(t) - a_r(t)) = 2a_r(t)$$

$$l(t) = m_s(t) + m_d(t) = (a_l(t) + a_r(t)) + (a_l(t) - a_r(t)) = 2a_l(t)$$

In a digital frequency demodulator the frequency demodulation needs to be performed at a high sampling rate because the bandwidth of the frequency modulating signal is about $$B_{fm} = 2(\Delta F + 2f_{nf})$$

with $\Delta F$ being the frequency deviation and $f_{nf}$ being the modulation frequency.

From this equation follows that the bandwidth of the frequency modulating signal is much larger than the bandwidth of the modulating signal. Therefore, the frequency demodulated signal can be sampling rate decimated.

Furtheron, the bandwidth of the stereo-multiplex signal is larger than the bandwidth of the audio signal. This can easily be seen in the above equation which defines the stereo-multiplex signal $m_{stmux}(t)$. Therefore, the sampling rate can be reduced in the stereo demultiplexer.

The digital stereo demultiplexer shown in FIG. 4 differs to that shown in FIG. 3 in that the filter 20 and the lowpass filter 21 are replaced by a first sampling rate decimation filter 22 which comprises a digital filter for the generation of the stereo-difference signal $m_d(t)$ and a second sampling rate decimation filter 23 which comprises a digital lowpass filter for the generation of the stereo-sum signal $m_s(t)$. Both sampling rate decimation filters have a decimation factor of D.

This solution has the disadvantage that the DPLL 19, which works similar to the PLL 19 shown in FIG. 3, needs to run at a high sampling rate. This requires high calculation power and therefore a high power consumption of the DSP that realizes the stereo demultiplexer.

The DPLL can also work at a reduced sampling rate. A simple method is to reduce the sampling rate of the bandpass filter output signal and to interpolate the DPLL output signal.

FIG. 5 shows such a digital stero-demultiplexer comprising a digital PLL-circuit 25 which works at a reduced sampling rate. In this stereo demultiplexer the generation of the stereo-difference signal $m_d(t)$ and the stereo-sum signal $m_s(t)$ is identical as in the stereo demultiplexer shown in FIG. 4, only the generation of the $2^{nd}$ harmonic of the pilot carrier differs.

The bandpass filter 18 shown in FIGS. 3 and 4 is replaced with a third sampling rate decimation filter 24 which comprises a digital bandpass filter. The third sampling rate decimation filter 24 has a sampling rate decimation factor E.

The DPLL 25 works with the reduced sampling rate and therefore receives the output signal of the third sampling rate decimation filter 24.

The coherent amplitude demodulation of the stereo-difference signal $m_d(t)$ needs to be performed at a sampling rate which is higher than the sampling rate of the audio signal, since the bandwidth of the stereo-multiplex signal m(t) is higher than the bandwidth of the audio signal. Therefore, the carrier for the coherent amplitude demodulation of the stereo-difference signal $m_d(t)$ needs to be generated with a higher sampling rate.

FIG. 5 shows that the output signal of the digital PLL-circuit 25 is interpolated in an interpolation unit 26 with an interpolation factor of E so that the $2^{nd}$ harmonic of the carrier is generated with a sampling rate that equals to the sampling rate of the stereo-multiplex signal m(t). Thereafter, to perform the coherent amplitude demodulation which is necessary to generate the stereo-difference signal $m_d(t)$, the so generated carrier with a carrier frequency of $\omega_{pil}$ that is locked in phase to the pilot carrier is multiplied with the stereo-multiplex signal m(t) by the demodulator 1.

In this embodiment the DPLL 25 runs at a reduced sampling rate and therefore outputs a lower number of samples per sample of the stereo-multiplex signal than the DPLL 19 shown in FIG. 4. So the required calculation power is low. On the other hand, the decimation bandpass filter within the third sampling rate decimation filter 24 and the interpolation bandpass filter within the interpolation unit 26 require high calculation power.

Therefore, all described stereo demultiplexers have the particular disadvantage that a quite high calculation power is needed.

Therefore, it is the object of the present invention to provide a stereo demultiplexer needing less calculation power.

The stereo demultiplexer according to the present invention is defined in independent claim 1. Preferred embodiments thereof are defined in dependent claims 2 to 9.

According to the present invention the second sampling rate decimation filter, i.e. the sampling rate decimation filter in the sum path, is used for the sampling rate decimation to generate the $2^{nd}$ harmonic or any other harmonic of the pilot carrier. This sampling rate decimation filter is available anyway and therefore the sampling rate decimation of the pilot carrier can be performed without an additional filter.

The sampling rate of the DPLL output signal needs to be upconverted to a higher sampling rate. Therefore, the sampling rate of the DPLL output signal needs to be interpolated by the same factor D than the sampling rate decimation of the stereo-sum signal.

Preferably, the sampling rate interpolation of the DPLL output signal is performed in the DPLL without any interpolation filter. In this case the interpolation is achieved on basis of one calculated and D–1 predicted sampling values for the respective harmonic of the pilot carrier. Each of the predicted values is preferrably calculated on basis of a phase correction of the one calculated value which is determined in accordance with the neccessary number of predicted values.

The present invention and its embodiments will be better understood from a detailed description of an exemplary embodiment thereof described in conjunction with the accompanying drawings, wherein FIG. 1 shows a stereo demultiplexer according to a preferred embodiment of the present invention;

Figure 1:
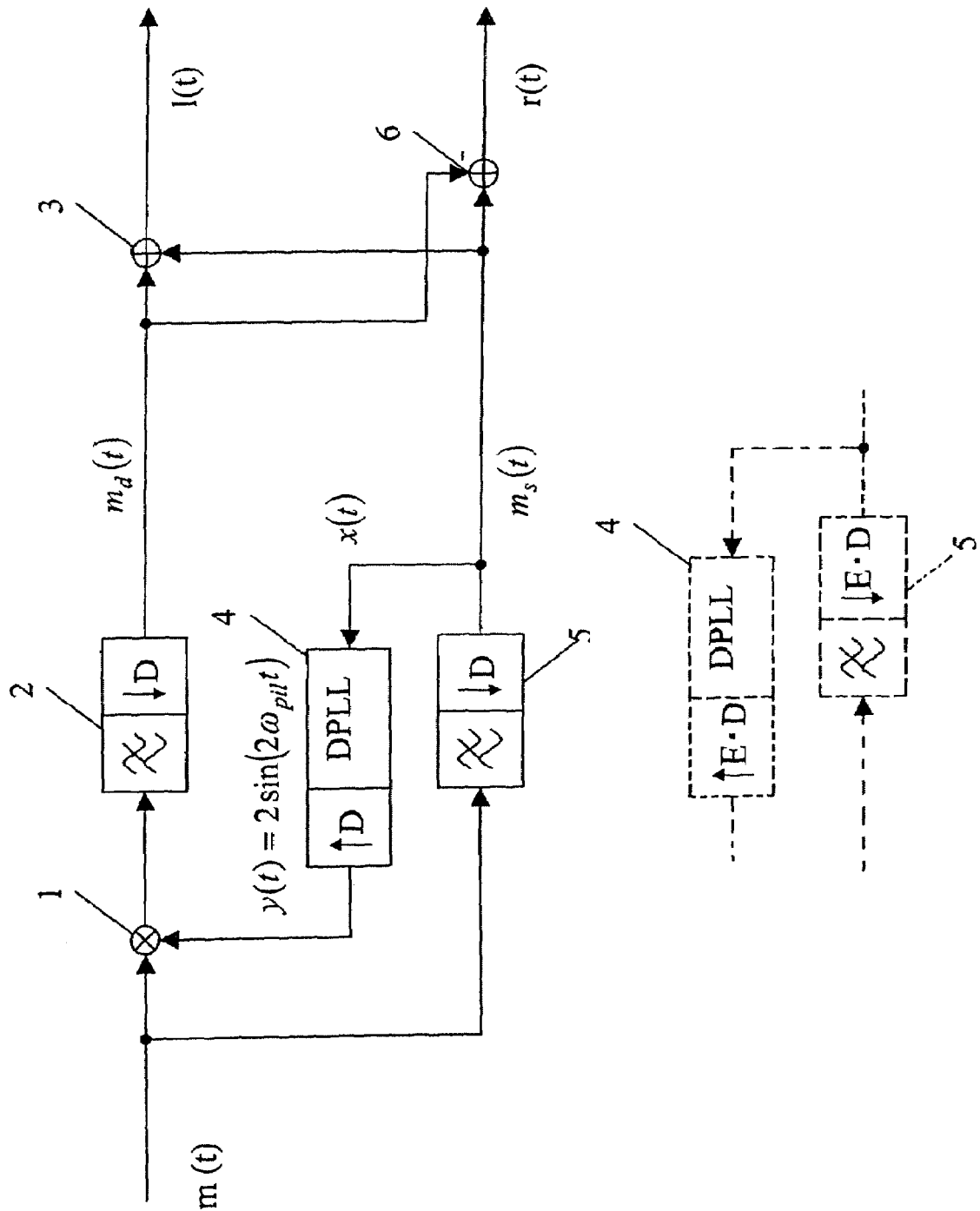

FIG. 1 shows a stereo demultiplexer according to a preferred embodiment of the present invention which elucidates the sampling rate decimation. As mentioned above, such a sampling rate decimation according to the present invention can be performed, because the frequency modulated stereo-multiplex signal m(t) has a much higher bandwidth than the frequency demodulated and stereo-demultiplexed audio signal.

As it is shown in FIG. 1, according to the present invention the stereo-sum signal $m_s(t)$ is generated from the stereo-multiplex signal m(t) by a sampling rate decimation with a decimation factor D by a first sampling rate decimation filter 5 which includes a lowpass filter.

Figure 3:
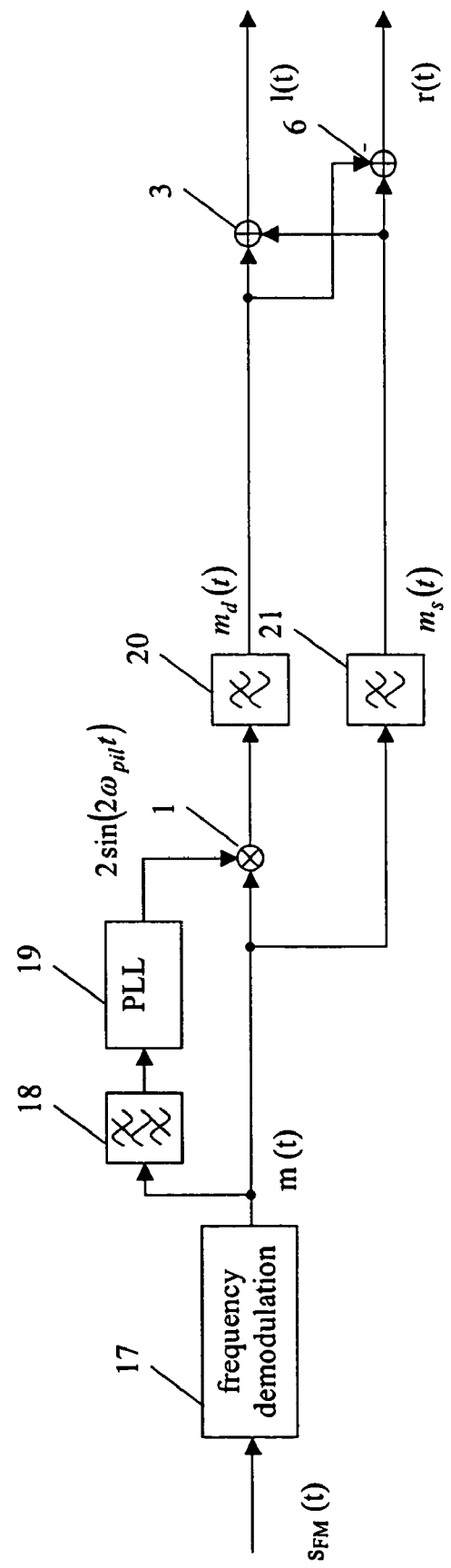
FIG. 3 shows an embodiment of a stereo demultiplexer according to the prior art.
Figure 4:
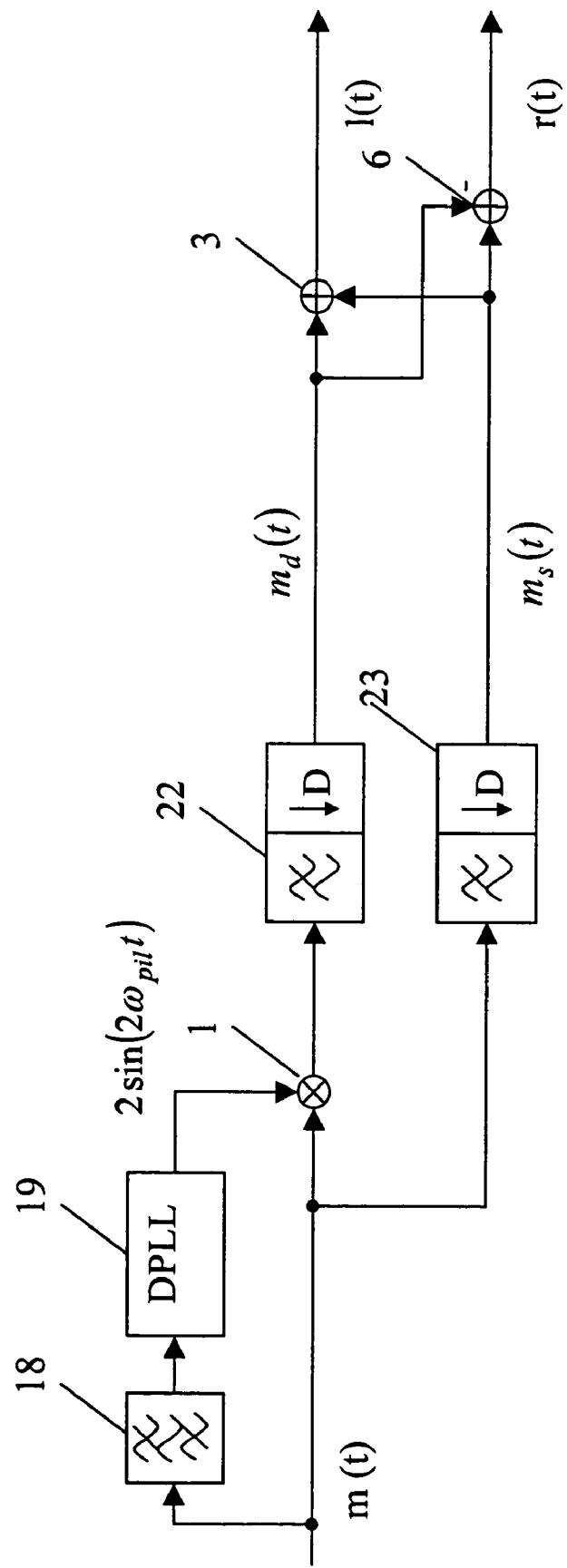
FIG. 4 shows another embodiment of a stereo demultiplexer according to the prior art.
Figure 5:
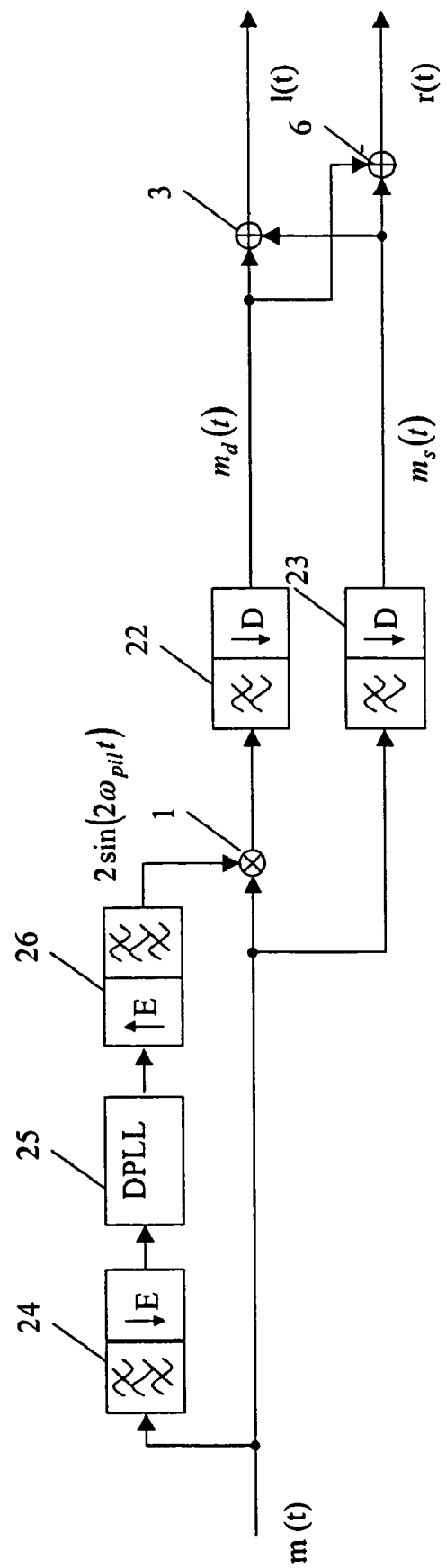
FIG. 5 shows a further embodiment of a stereo demultiplexer according to the prior art.

The so generated stereo-sum signal $m_s(t)$ is thereafter fed to an adder 3 and a subtracter 6 as described in connection with the stereo demultiplexers shown in FIGS. 3 to 5.

According to the present invention also a digital PLL-circuit 4 is working with a decimated sampling rate, but the decimation filtering of the sum path, i.e. the path to generate the stereo-sum signal $m_s(t)$ is used for the sampling rate decimation of the stereo-sum signal $m_s(t)$ and the pilot carrier, i.e. the output signal of the first sampling rate decimation filter 5 is not only input to the adder 3 and the subtracter 6, but also to the DPLL-cicrcuit 4.

In the shown embodiment, the DPLL-circuit 4 generates a carrier for the coherent amplitude demodulation of the stereo-difference signal $m_d(t)$.

As also mentioned above, the coherent amplitude demodulation of the stereo-difference signal $m_d(t)$ needs to be performed at a sampling rate which is higher than the sampling rate of the audio signal, since the bandwidth of the stereo-multiplex signal m(t) is higher than the bandwidth of the audio signal.

Therefore, the carrier for the coherent amplitude demodulation of the stereo-difference signal $m_d(t)$ needs to be generated with a higher sampling rate. FIG. 1 shows that the carrier is generated with a sampling rate that is D times higher than the sampling rate of the stereo-sum signal $m_s(t)$, since the second harmonic of the pilot carrier generated by the DPLL-circuit 4 is interpolated by an interpolation factor of D within the DPLL-circuit 4.

To perform the coherent amplitude demodulation which is necessary to generate the stereo-difference signal $m_d(t)$ the so generated carrier with a carrier frequency of $2\omega_{pil}$ that is locked in phase to the pilot carrier is multiplied with the stereo-multiplex signal m(t) by a demodulator 1 which directly corresponds to the demodulators 1 described in connection with FIGS. 3 to 5.

The stereo-difference signal $m_d(t)$ is generated equally as described in connection with FIGS. 3 to 5. Therefore, the output signal of the demodulator 1 is sampling rate decimated by a second sampling rate decimation filter 2 which includes a lowpass filter. The so generated stereo-difference signal $m_d(t)$ is fed to an adder 3 and a subtracter 6 as described in connection with the stereo demultiplexers described above in connection with FIGS. 3 to 5.

Furtheron, if neccessary, delay elements which equalize the group delay of the first and second sampling rate decimation filters in the sum path and the difference path can be inserted into the stereo-demiultiplexer to achieve that certain signals have the same time relationship.

Additionally to the usage of the decimation filtering of the sum path for the sampling rate decimation of the pilot carrier a further sampling rate decimation can be performed, e.g by a decimation factor of E. In this case also the interpolation factor has to be increased to a value D·E, i.e. so that the recovered pilot carrier has a sampling rate equal to that of the frequency demodulated stereo-multiplex signal m(t).

Figure 2:
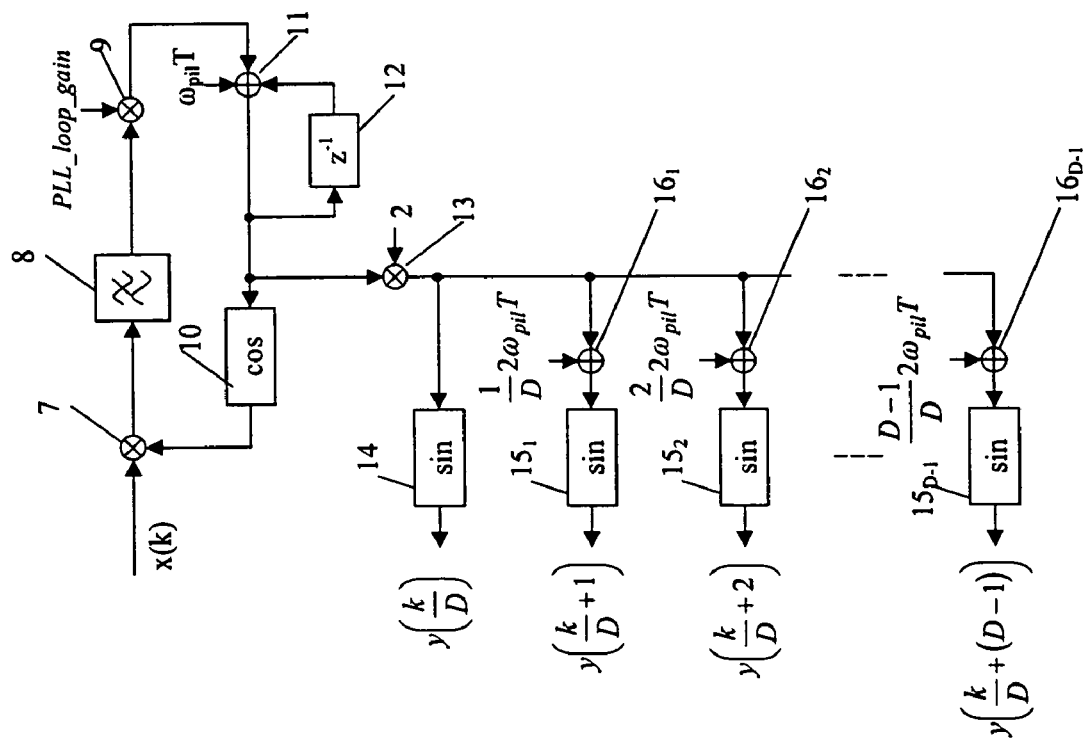
FIG. 2 shows parts of a digital PLL-circuit shown in FIG. 1.

FIG. 2 shows parts of the digital PLL-circuit 4 in more detail. Basically, the digital PLL-circuit 4 comprises a PLL which outputs a phase signal, a multiplier 13 which multiplies this phase signal with a constant factor which determines which harmonic of the pilot carrier is to be generated and one or more sinus calculation units which output samples of the reconstructed pilot carrier based on the multiplied phase signal. The number of sinus calculation units determines the interpolation factor.

The PLL itself comprises a first multiplier 7 receiving samples of the stereo-sum signal $m_s(t=1, 2, \ldots)=x(k)$ as multiplicant at a first input, a filter 8 receiving the output signal of said first multiplier 7, a second multiplier 9 multiplying the output signal of the filter 8 with the gain of the phase locked loop, i.e. with a signal PLL_loop_gain, a first adder 11 receiving said output signal of the second multiplier 9 at a first input as a first summand, a constant representing the product of the pilot carrier frequency $\omega_{pil}$ and the sampling period T at a second input as a second summand and a delayed phase signal which is the output signal of said first adder 11 at a third input as a third summand, a delay element 12 receiving said phase signal output of said first adder 11 and supplying said delayed phase signal of said first adder 11 to said third input of said first adder 11, and a cosinus calculation unit 10 receiving the phase signal of said first adder 11 and supplying its output signal as multiplier to a second input of said first multiplier 7.

To generate the second harmonic of the pilot carrier the phase signal is multiplied with the constant factor 2 by the third multiplier 13. The output signal of the third multiplier 13 is input to a first sinus calculation unit 14 which transfers the phase signal into a corresponding calculated sample of the second harmonic of the pilot carrier.

To perform an interpolation with an interpolation factor D there is the need that D−1 output samples are aditionally generated based on the phase signal calculated on basis of one input sample x(k). Therefore, one of D−1 phase shift values equally dividing the range to the next expected phase signal, i.e. the phase signal for the input sample x(k+1), is respectively added to the phase signal by a respective one of D−1 adders $16_1$ to $16_{D-1}$ before these generated D−1 phase signals are respectively input to D−1 sinus calculation units $15_1$ to $15_{D-1}$. These D−1 sinus calculation units respectively output one of D−1 interpolated samples of the second harmonic of the pilot carrier.

The output signals of the first to $D^{th}$ sinus calculation units are sequentially output as samples of second harmonic of the pilot carrier, i.e. as a signal $y(t=1, 2, \ldots)=y(k/D)$, $y(k/D+1), \ldots, y(k/D+(D-1))$.

The cosinus calculation unit 10 and the sinus calculation units 14, $15_1$ to $15_{D-1}$ are advantageously realized as look-up tables. Of course, all sinus calculation units 14, $15_1$ to $15_{D-1}$ can be realized as just one sinus calculation unit, since the respective output values are not needed simultaneously.

The invention claimed is:

1. Stereo demultiplexer configured to receive a frequency demodulated stereo-multiplex signal which comprises at least a stereo-difference signal, a stereo-sum signal and a pilot carrier, said stereo demulitplexer comprising:

a decimation filter configured to extract, from said frequency demodulated stereo-multiplex signal, a sampling rate decimated signal decimated by a factor D regarding said frequency demodulated stereo-multiplex signal, thereby providing the stereo-sum signal and the pilot carrier signal and eliminating the stereo-difference signal; and a PLL-circuit configured to receive said extracted signal as an input signal and for recovering, from said input signal, the pilot carrier or at least one harmonic of the pilot carrier to perform an amplitude demodulation.

2. Stereo demultiplexer according to claim 1, further comprising:

sampling rate decimation means configured to further decimate the sampling rate of said extracted signal by a decimation factor E, before said PLL-circuit receives the signal that passed through the decimation filter and the sampling rate decimation means.

3. Stereo demultiplexer according to claim 1, wherein said PLL-circuit is configured to output a recovered pilot carrier which is interpolated so that the recovered pilot carrier has a sampling rate equal to that of the frequency demodulated stereo-multiplex signal.

4. Stereo demultiplexer according to claim 3, wherein said PLL-circuit comprises:

means configured to alternately output D−1 or (E·D)−1 interpolated pilot carrier values (y(k/D+1), . . . , y(k/D+(D−1))) and one calculated pilot carrier value (y(k/D)).

5. Stereo demultiplexer according to claim 4, wherein said PLL-circuit is further configured to perform said interpolation on a basis of a prediction starting at said calculated pilot carrier value.

6. Stereo demultiplexer according to claim 5, further including:

a PLL within the PLL-circuit configured to output a phase signal, and a first sine calculation unit configured to output said one calculated pilot carrier value (y(k/D)) on a basis of said phase signal.

7. Stereo demultiplexer according to claim 6, further including:

second to $D^{th}$ or $(E·D)^{th}$ sine calculation units each configured to output one of said D−1 or (E·D)−1 interpolated pilot carrier values (y(k/D+1), . . . , y(k/D+(D−1))) on a basis of said phase signal and a respective added phase shift value.

8. Stereo demultiplexer according to claim 6, further including:

a third multiplexer configured to multiplex said phase signal with a factor 2 before the phase signal is input to said first sine calculation unit or a respective second to $D^{th}$ or $(E·D)^{th}$ sine calculation unit via a respective second to $D^{th}$ or $(E·D)^{th}$ adder, configured to add said respective phase shift value so that the $2^{nd}$ harmonic of the pilot carrier is generated.

9. Stereo demultiplexer according to claim 6, wherein said PLL comprises:

a first multiplier configured to receive samples of the stereo-sum signal as multiplicant at a first input, a filter configured to receive the output signal of said first multiplier, a second multiplier configured to multiply said output signal of said filter with a PLL gain, a first adder configured to receive said output signal of said second multiplier at a first input as a first summand, configured to receive a constant representing the product of a pilot carrier frequency and the sampling period at a second input as a second summand, and configured to receive a delayed phase signal which is the output signal of said first adder at a third input as a third summand, a delay element configured to receive said phase signal of said first adder and configured to supply said delayed phase signal to said third input of said first adder, and a cosine calculation unit configured to receive the phase signal of said first adder and configured to supply an output signal of the cosine calculation unit as multiplier to a second input of said first multiplier.

10. Stereo demultiplexer according to claim 6, including a third multiplexer configured to multiply said phase signal with a factor 2 before the phase signal is input to said first sine calculation unit and a respective second to $D^{th}$ or $(E \cdot D)^{th}$ sine calculation unit via a respective second to $D^{th}$ or $(E \cdot D)^{th}$ adder configured to add said respective phase shift value so that the $2^{nd}$ harmonic of the pilot carrier is generated.

11. The stereo demultiplexer of claim 1, further comprising:

channel recovery means configured to recover a left or right channel associated with said stereo-multiplex signal on a basis of first and second intermediate signals; and a sampling rate decimator configured to decimate a sampling rate of one of said first and second intermediate signals by a decimation factor E, and configured to supply said sampling rate decimated intermediate signal to said PLL-circuit as said input signal.

12. The stereo demultiplexer of claim 11, wherein said channel recovery means is an adder configured to receive said first and second intermediate signals as an input.

13. The stereo demultiplexer of claim 1, further comprising:

channel recovery means configured to recover a left or right channel associated with said stereo-multiplex signal on the basis of first and second intermediate signals, wherein said input signal is one of said first and second intermediate signals.

14. The stereo demultiplexer of claim 13, wherein said channel recovery means is an adder configured to receive said first and second intermediate signals as an input.

15. The stereo demultiplexer of claim 1, wherein said PLL-circuit is configured to output a recovered pilot carrier which is interpolated so that the recovered pilot carrier has a sampling rate equal to that of the frequency demodulated stereo-multiplex signal.

* * * * *